United States Patent
Reichenberger et al.

(10) Patent No.: US 10,207,338 B2
(45) Date of Patent: Feb. 19, 2019

(54) TOOL HOLDER FOR CONNECTING A DIAMOND DRILL TO A DRILL BIT

(71) Applicant: Hilti Aktiengesellschaft, Schaan (LI)

(72) Inventors: Thomas Reichenberger, Penzing (DE); Xaver Ried, Kaufering Penzing (DE)

(73) Assignee: Hilti Aktiengesellschaft, Schaan (LI)

( * ) Notice: Subject to any disclaimer, the term of this patent is extended or adjusted under 35 U.S.C. 154(b) by 3 days.

(21) Appl. No.: 15/328,106

(22) PCT Filed: Jul. 22, 2015

(86) PCT No.: PCT/EP2015/066723
§ 371 (c)(1),
(2) Date: Jan. 23, 2017

(87) PCT Pub. No.: WO2016/012483
PCT Pub. Date: Jan. 28, 2016

(65) Prior Publication Data
US 2017/0209943 A1    Jul. 27, 2017

(30) Foreign Application Priority Data
Jul. 22, 2014   (EP) .................................... 14177933

(51) Int. Cl.
*B23B 51/04* (2006.01)
*B23B 31/11* (2006.01)
(Continued)

(52) U.S. Cl.
CPC ...... *B23B 51/0473* (2013.01); *B23B 31/1122* (2013.01); *F16D 1/108* (2013.01);
(Continued)

(58) Field of Classification Search
CPC .......... B23B 2231/0276; B23B 31/023; B23B 31/11; B23B 31/1122; Y10T 408/94;
(Continued)

(56) References Cited

U.S. PATENT DOCUMENTS 2,212,406 A * 8/1940 Rusnak ................. B23B 31/113
279/904
2,324,225 A * 7/1943 Mueller .............. B23B 31/1175
137/318

(Continued)

FOREIGN PATENT DOCUMENTS

| DE | 9412764 | 10/1994 |
|----|---------|---------|
| EP | 0325087 | 7/1989 |
| EP | 0771933 | 5/1997 |
| EP | 1424 152 A1 | 6/2004 |
| EP | 1923156 | 5/2008 |

*Primary Examiner* — Daniel Howell
*Assistant Examiner* — Yasir Diab
(74) *Attorney, Agent, or Firm* — Davidson, Davidson & Kappel, LLC (57) ABSTRACT

A device for holding and securing a tool, in particular, a drill bit, on a machine tool, for example, a core drill, including an output shaft for transmitting a torque generated in the machine tool to the tool; and a union nut positioned around the output shaft for detachably connecting the output shaft to an attachment end of the tool.

The output shaft includes a locking ring and the union nut includes a washer disk, as well as an attenuator, the washer disk being positioned between the locking ring and the attenuator.

14 Claims, 9 Drawing Sheets

(51) Int. Cl.
*F16D 1/108* (2006.01)
*F16D 1/116* (2006.01)
*F16D 1/10* (2006.01)

(52) U.S. Cl.
CPC .......... *F16D 1/116* (2013.01); *B23B 2226/33* (2013.01); *B23B 2226/61* (2013.01); *B23B 2260/106* (2013.01); *F16D 2001/102* (2013.01); *F16D 2001/103* (2013.01); *Y10T 279/17948* (2015.01); *Y10T 408/957* (2015.01)

(58) Field of Classification Search
CPC ............... Y10T 408/95; Y10T 408/957; Y10T 279/17948; Y10T 279/17941; Y10T 279/17931; Y10T 279/28; Y10T 279/15; Y10T 279/16
See application file for complete search history.

(56) References Cited

U.S. PATENT DOCUMENTS

| | | | | |
|---|---|---|---|---|
| 2,580,930 | A * | 1/1952 | Kost | ....................... B21D 28/34 279/30 |
| 2,896,955 | A * | 7/1959 | Treppard | ................. B23B 31/11 279/7 |
| 3,984,192 | A * | 10/1976 | Wanner | ................... B23B 31/11 279/100 |
| 4,722,645 | A * | 2/1988 | Regan | ................... B23B 31/006 279/145 |
| 5,000,631 | A | 3/1991 | Deutschenbaur et al. | |
| 7,073,797 | B2 | 7/2006 | Gaul | |
| 2004/0018063 | A1 * | 1/2004 | Ostermeier | ........... B23B 31/107 408/204 |

* cited by examiner

TOOL HOLDER FOR CONNECTING A DIAMOND DRILL TO A DRILL BIT

The present invention relates to a device for holding and securing a tool, in particular, a drill bit on a machine tool, for example, a core drill, including an output shaft for transmitting a torque generated in the machine tool to the tool and a union nut positioned around the output shaft for detachably connecting the output shaft to an attachment end of the tool.

BACKGROUND

A core drill as well as a drilling tool, a so-called drill bit, are the essential requirements for carrying out a core drilling or hollow core drilling. The core drill includes, in principle, an electric motor as a drive and for generating a torque, as well as an output shaft for transmitting this torque. The drill bit is made up essentially of a cylindrical hollow body (steel casing) having a diamond segmentation at a cutting end and an attachment piece at a fastening end. The drill bit is fastened with the attachment piece to the output shaft of the core drill in such a way that the torque generated in the core drill is transmitted to the drill bit. The torque transmitted to the drill bit sets the core drill in rotation, as a result of which the cutting end with the diamond segmentation is rotated into a material and in this way a hole may be drilled into the material. The material is usually mineral rock or concrete.

The output shaft of core drills usually has a simple thread, with which the output shaft or core drill is connected to the attachment piece of the drill bit. A threaded connection of this type is referred to, for example, as a BS interface. To install or remove the drill bit on or from the output shaft of the core drill, a special tool in the form of a (screw-) wrench is normally required. Correctly tightening the thread as well as loosening of the thread without this special tool and merely by hand is extremely difficult or even impossible. The often times extremely high torque transmitted by the core drill to the drill bit may result in a very strong force-fit in the thread between the output shaft and the drill bit.

A tool holder for a drill bit for fastening to a core drill is described, for example, in European Patent Application EP 1424 152 A1 in the form of a thread according to the prior art. In this case, a chucking end of the drill bit includes an external thread flange and a gear shaft of the core drill and an internal thread flange. The external thread flange and the internal thread flange are axially tightened to one another in order to fasten the drill bit to the gear shaft.

In tool holders according to the prior art presently on the market, undesirable effects may appear in the event of extreme strain. Thus, for example, the screw fitting between the output shaft and the drill bit may become loose as a result of vibrations and shocks during core drilling. Vibrations and shocks during core drilling may, however, also result in an even tighter force-fit in the thread between the output shaft and the drill bit, so that the thread may be loosened again only with very great effort. Contaminants resulting from accumulating drill dust or deformations as a result of an external force effect may cause damage to individual components of the tool holder, which, in turn, may result in a malfunction or in a complete failure of the tool holder.

SUMMARY OF THE INVENTION

It is an object of the present invention to solve the problems described above and, in particular, to provide a device for holding and securing a tool, in particular, a drill bit, on a machine tool, for example, a core drill, which ensures an improved installation and removal of a drill bit on a core drill, as well as the secure retention of the drill bit on the core drill during the actual core drilling.

For this purpose, a device is provided for holding and securing a tool, in particular, a drill bit, on a machine tool, for example, a core drill, including an output shaft for transmitting a torque generated in the machine tool to the tool and a union nut for detachably connecting the output shaft to an attachment end of the tool.

According to the present invention, it is provided that the output shaft includes a locking ring and the union nut includes a washer disk as well as an attenuator, the washer disk being positioned between the locking ring and the attenuator.

In this way, it is possible to ensure an improved installation and removal of the tool on the machine tool, as well as the secure retention of the tool on the machine tool during the actual core drilling without the aid of a tool.

According to one advantageous specific embodiment of the present invention, it may be provided that in a connected state of the union nut to the receiving end of the tool, an inner surface of the union nut presses against the attenuator, as a result of which the washer disk presses in a force-fitting manner against the locking ring. The inner surface in this case may be positioned essentially perpendicular to the outer surface of the union nut, so that this inner surface extends in parallel to the attenuator, to the washer disk and to the locking ring. With the aid of the attenuator, the union nut may be prevented from loosening in the event of vibrations during the operation of the machine tool, and the output shaft and the tool from therefore no longer being securely connected to one another.

According to another advantageous specific embodiment of the present invention, it may be provided that the union nut includes an internal thread and the receiving end of the tool includes an external thread corresponding to the internal thread of the union nut, which serves to detachably connect the output shaft to the receiving end of the tool. In this way, the output shaft and the receiving end of the tool may be detachably connected to one another in a simple manner without the use of tools.

According to another advantageous specific embodiment of the present invention, it may be provided that the union nut is made of plastic. In this way, the union nut may be screwed more easily to the receiving end of the tool, and also more easily unscrewed from the receiving end of the tool.

According to another advantageous specific embodiment of the present invention, it may be provided that the locking ring and the washer disk are made of metal. In this way, it is possible to achieve a preferably strong force-locked connection between the locking ring and the washer disk.

BRIEF DESCRIPTION OF THE DRAWINGS

Additional advantages result from the following figure description. Various exemplary embodiments are depicted in the figures. The figures, the description and the claims include numerous features in combination. Those skilled in the art will advantageously also view the features individually and combine them to form additional meaningful combinations.

DETAILED DESCRIPTION

Figure 1:
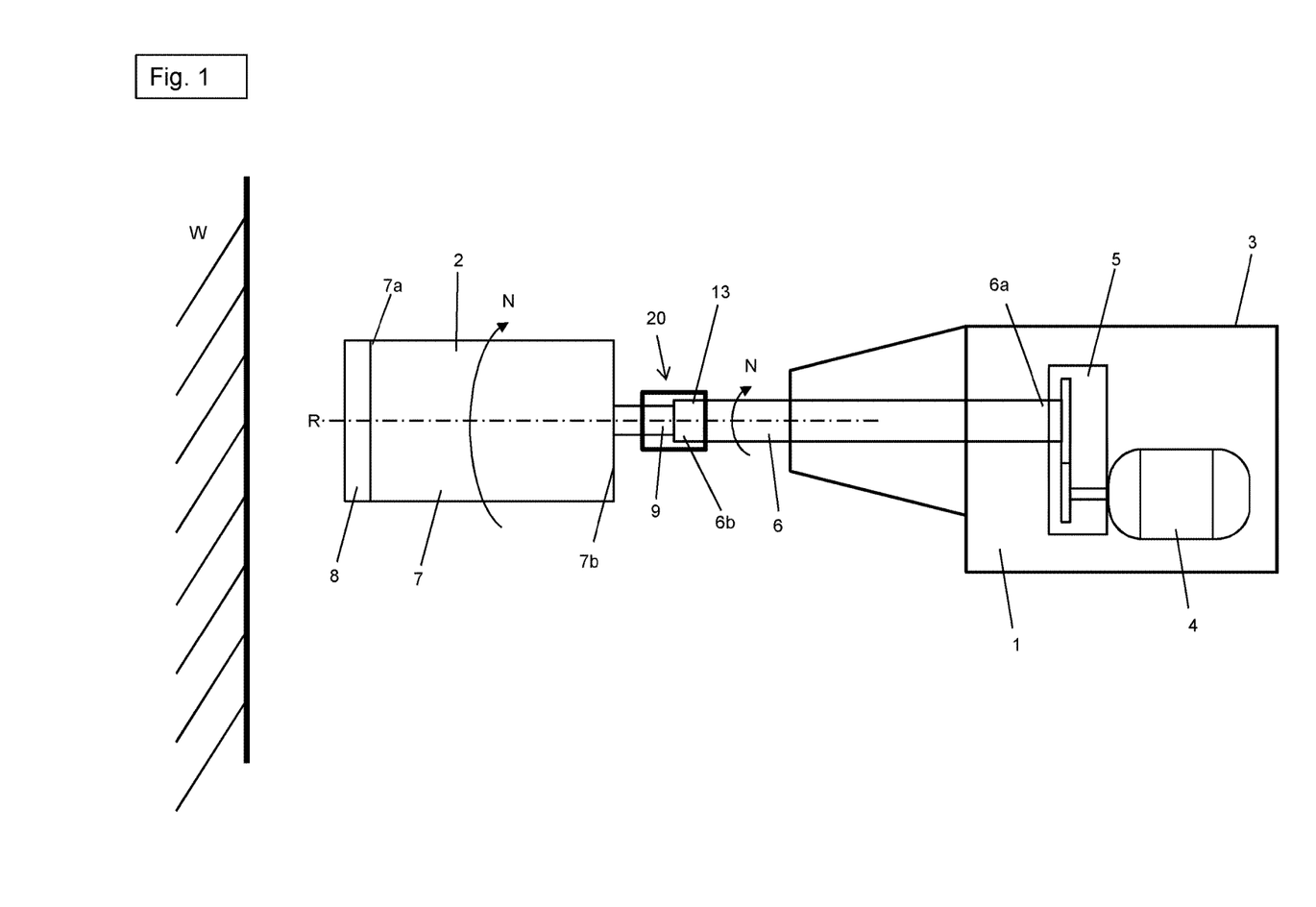
FIG. 1 shows a schematic view of a machine tool designed as a core drill including an output shaft, connected to a tool designed as a drill bit and a device according to the present invention for holding and securing a tool on a machine tool.

FIG. 1 shows a perspective view of a machine tool 1, which is connected to a tool 2. Machine tool 1 in this case is designed as a core drill. Tool 2 is designed in the form of a drill bit.

Core drill 1 includes essentially a housing 3, a drive 4, a gear mechanism 5 and an output shaft 6. Drive 4 is implemented by an electric motor. Drive 4, designed as an electric motor, and gear mechanism 5 are positioned completely within housing 3. Output shaft 6 includes a first end 6a and a second end 6b. First end 6a is connected to gear mechanism 5. Gear mechanism 5, in turn, is connected to electric motor 4. Second end 6b of output shaft 6 protrudes from housing 3.

Figure 2:
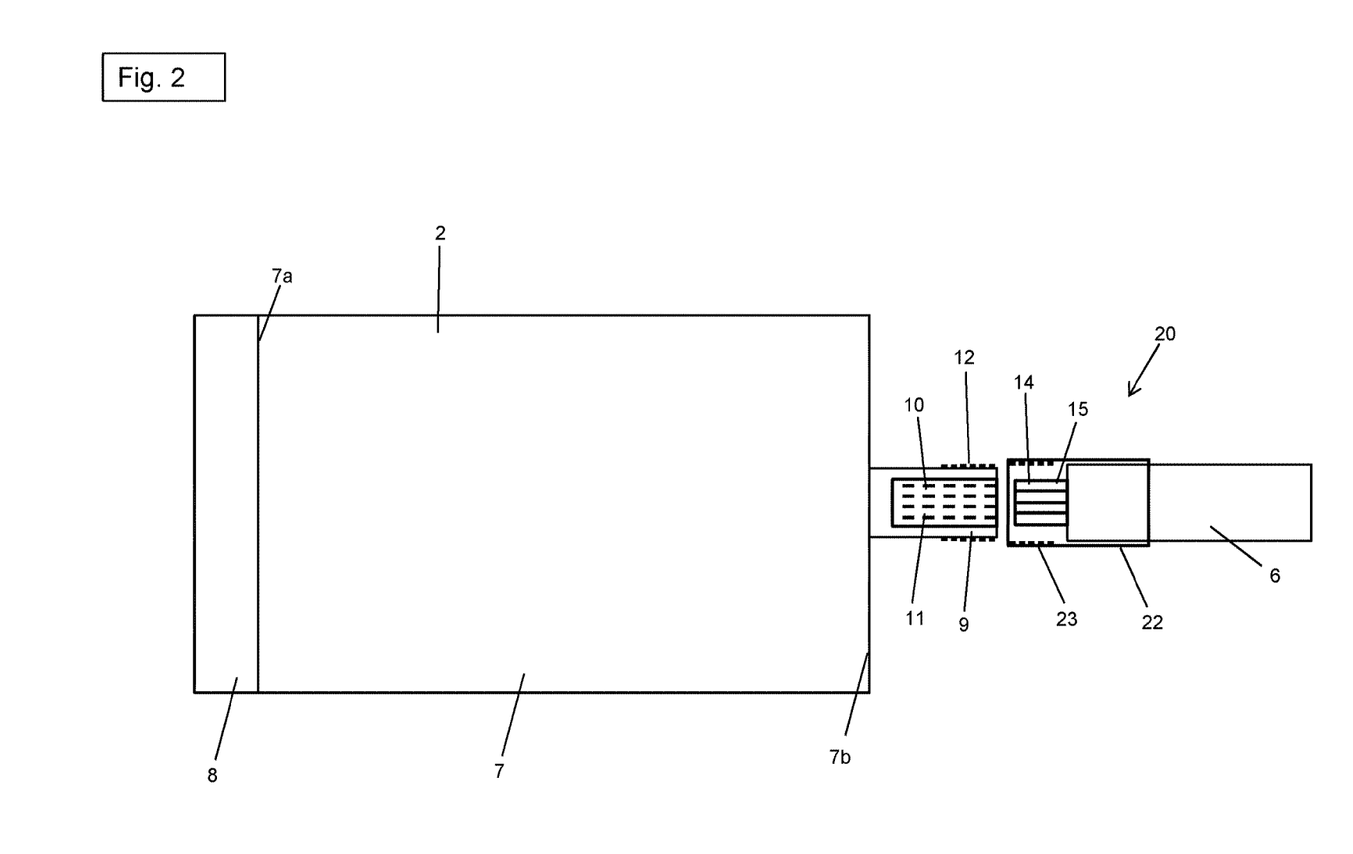
FIG. 2 shows a schematic view of an attachment end of the drill bit and a connecting end of the output shaft.

Drill bit 2 includes a cylindrical hollow body 7 having a first end 7a and a second end 7b. A diamond segmentation 8 is positioned as a cutting end at first end 7a. A hole may be drilled into a mineral material W with the aid of diamond segmentation 8. An attachment end 9 is provided at second end 7b. Attachment end 9 includes a hollow gearwheel 10 with internal toothing 11 (see FIGS. 2 and 9) as well as external thread 12 (see FIGS. 2, 4, 5, 8 and 9).

A torque generated in electric motor 4 is transmitted with the aid of gear mechanism 5 to output shaft 6, which is thereby rotated about rotational axis R in rotation direction N.

Figure 4:
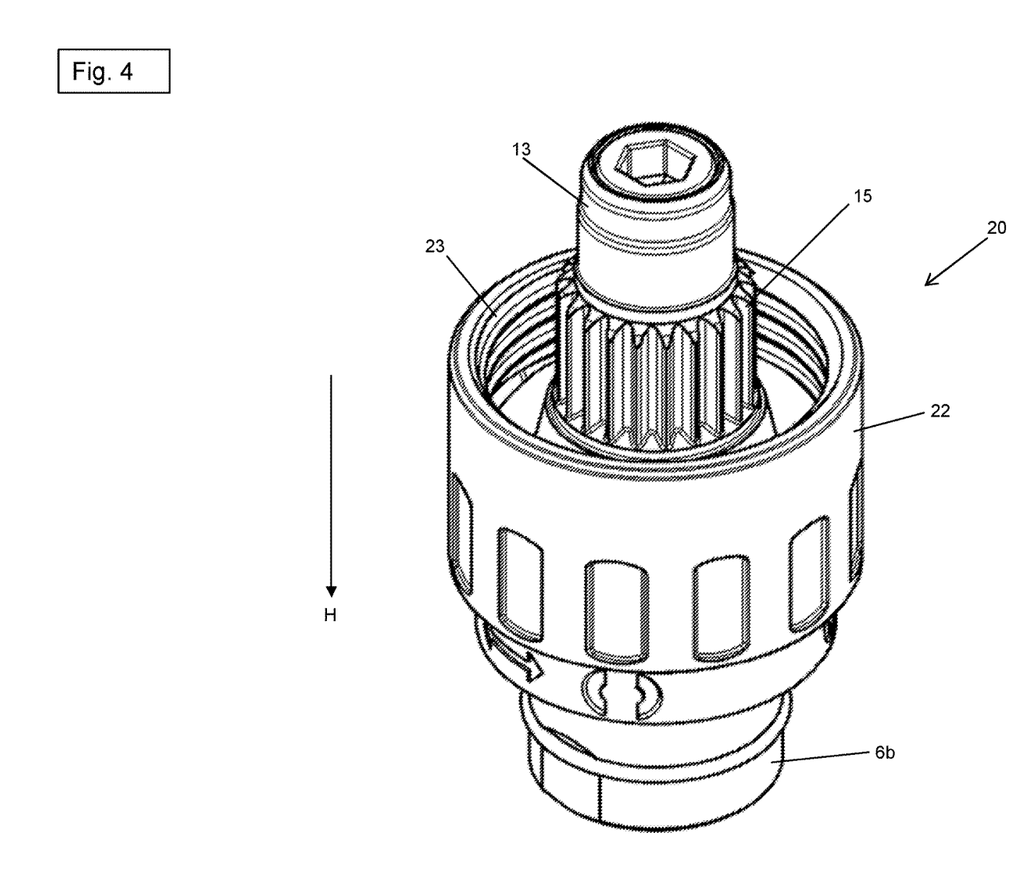
FIG. 4 shows a perspective view of the device according to the present invention for holding and securing the tool on the machine tool with the union nut.

As depicted, in particular, in FIGS. 4 and 5, a connecting end 13 is provided at second end 6b of output shaft 6, which (as described in detail below) is used to connect output shaft 6 to drill bit 2 and in this way to transmit the torque of output shaft 6 to drill bit 2. Connecting end 13 of output shaft 6 includes a gearwheel 14 with external toothing 15, which is non-rotatably connected to output shaft 6. Gearwheel 14 is designed to be fitted into correspondingly designed hollow gearwheel 10 of attachment end 9 of drill bit 2. Internal toothing 11 of hollow gearwheel 10 of attachment end 9 corresponds accordingly to external toothing 15 of gearwheel 14 of output shaft 6. According to one specific embodiment according to the present invention not shown, it is also possible that connecting end 13 of output shaft 6 does not include a gearwheel and attachment end 9 of drill bit 2 does not include a hollow gearwheel 10. Instead, a section may be provided at connection end 13 of output shaft 6, which corresponds to a spline, a spline shaft, a polygon or something similar. Similarly, a section may also be provided at attachment end 9 of drill bit 2, which is provided for receiving the section of connecting end 13 of output shaft 6 designed as a spline, spline shaft, polygon or something similar. The section at connecting end 13 of output shaft 6 therefore fits into the section of attachment end 9 of drill bit 2 and thereby constitutes a form-locked connection and torque transmission option between output shaft 6 and drill bit 2.

Figure 3:
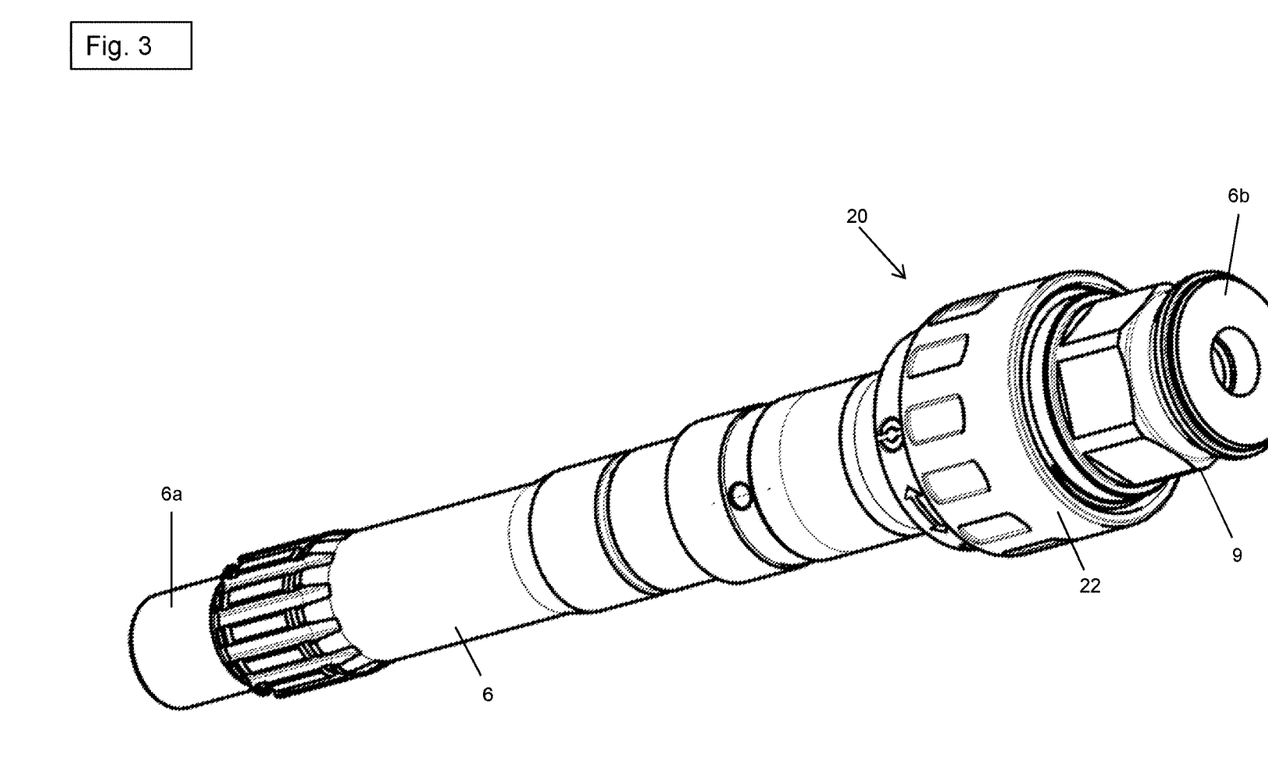
FIG. 3 shows a perspective view of the device according to the present invention for holding and securing the tool on the machine tool, including a union nut on the output shaft of the core drill together with the attachment end of the drill bit.

As shown, in particular, in FIG. 3, a device 20 for holding and securing drill bit 2 on core drill 1 is provided at the second end, i.e., at connecting end 13 of output shaft 6. A simple installation and removal of drill bit 2 on core drill 1, as well as the secure retention of drill bit 2 on core drill 1 during the actual core drilling may be ensured with the aid of this device 20. Device 20 in this case is designed in such a way that drill bit 2 may be installed and removed on core drill 1 without the aid of a tool and merely by hand.

As depicted in the FIGS. 3, 4, 5, 8 and 9, device 20 includes a cylindrical union nut 22 for holding and securing drill bit 2 on core drill 1, a locking ring 25, a washer disk 26 and an attenuator 27.

Union nut 22 includes a first end 22a, a second end 22b an inner side 22c and an outer side 22d. An internal thread is positioned on inner side 22c at first end 22a. Internal thread 23 of union nut 22 corresponds to corresponding external thread 12 of attachment end 9 of drill bit 2. An inner surface 24, which extends perpendicularly to outer side 22d of union nut 22, is provided at second end 22b of union nut 22 (see FIGS. 8 and 9).

Figure 5:
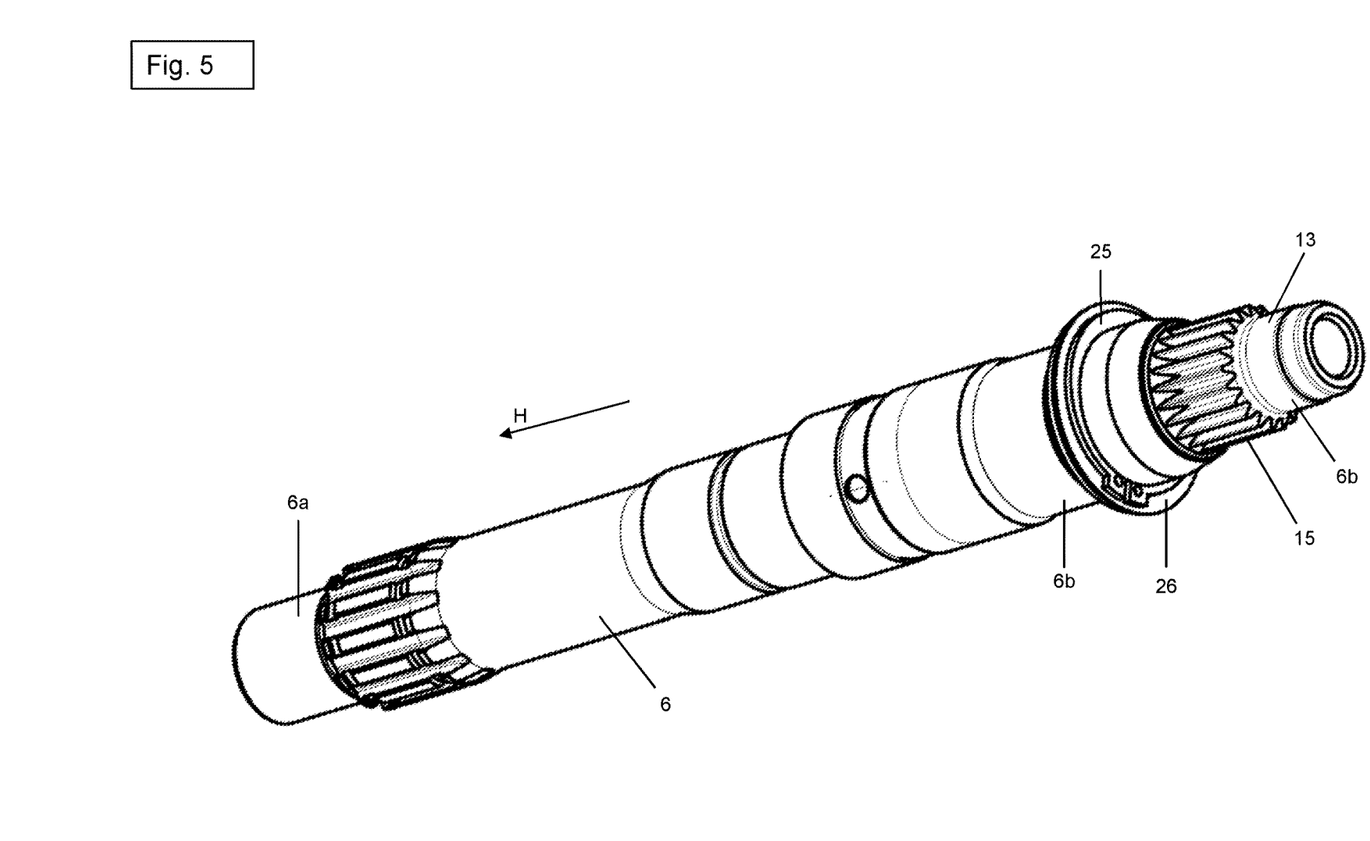
FIG. 5 shows a perspective view of the output shaft including a locking ring and a washer disk.
Figure 6:
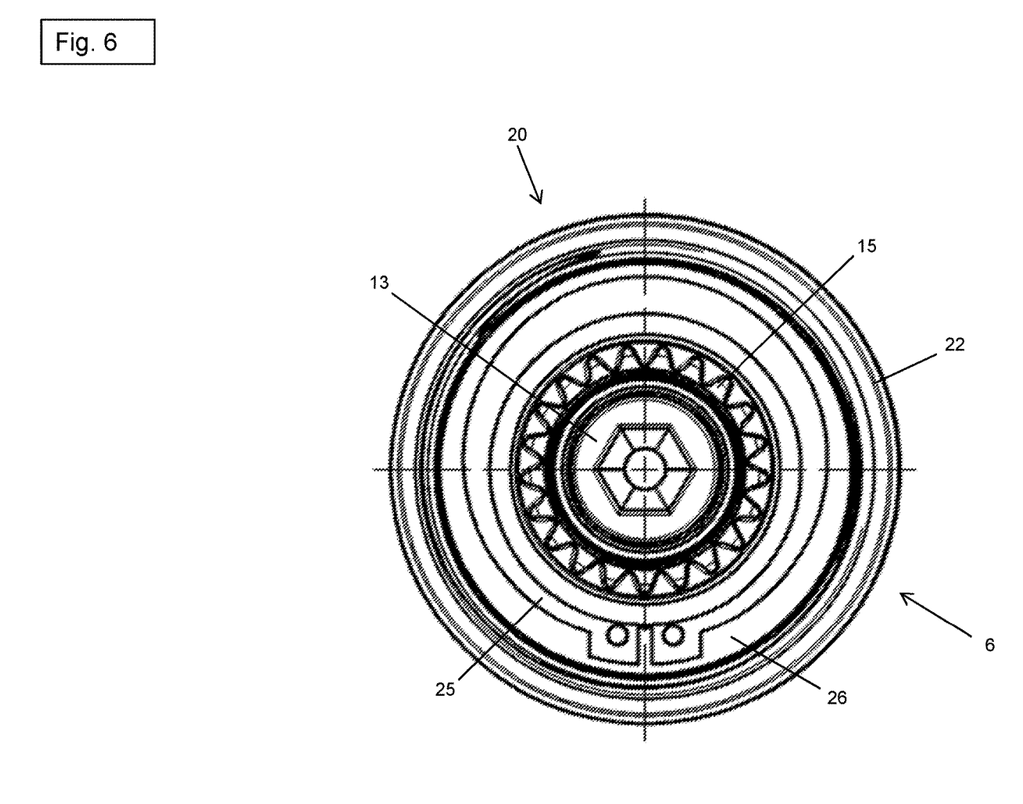
FIG. 6 shows a front view of the device according to the present invention for holding and securing the tool on the machine tool.
Figure 7:
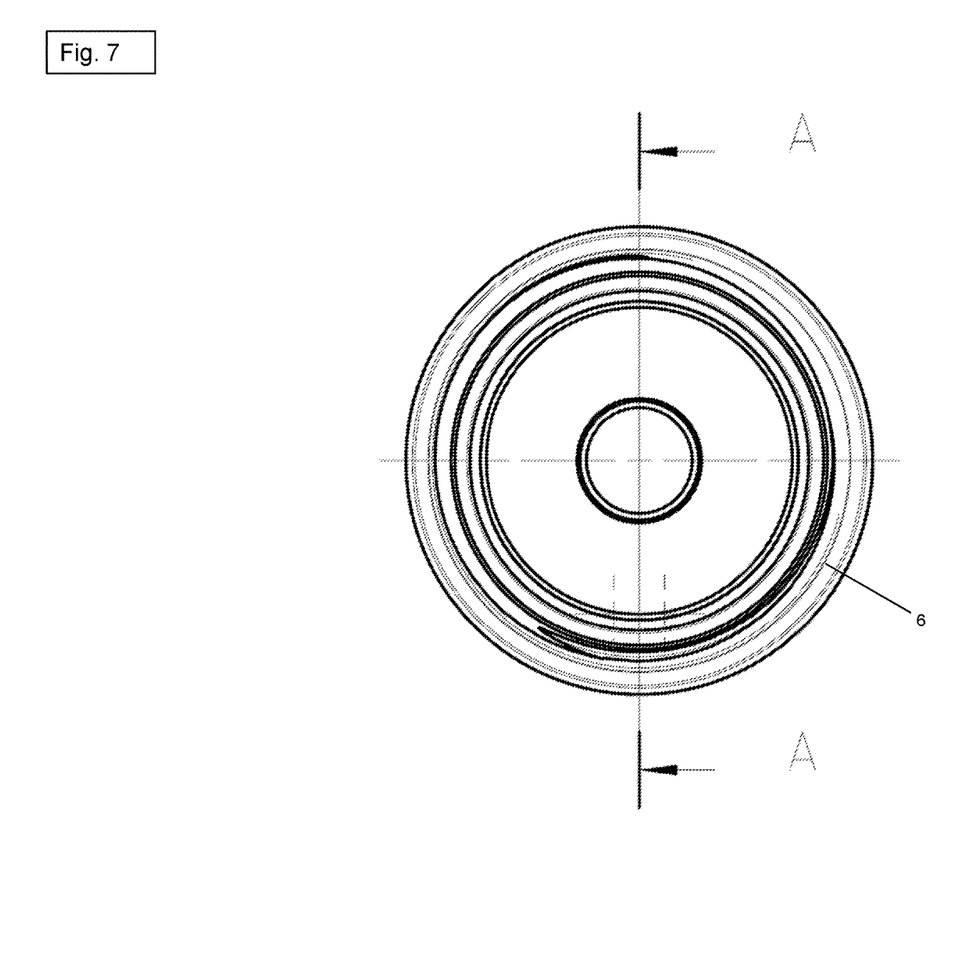
FIG. 7 shows a rear view of the device according to the present invention for holding and securing the tool on the machine tool.

As depicted in FIG. 5, locking ring 25 is firmly positioned on output shaft 6. Locking ring 25 in this case is placed in front of washer disk 26 in arrow direction H.

Figure 8:
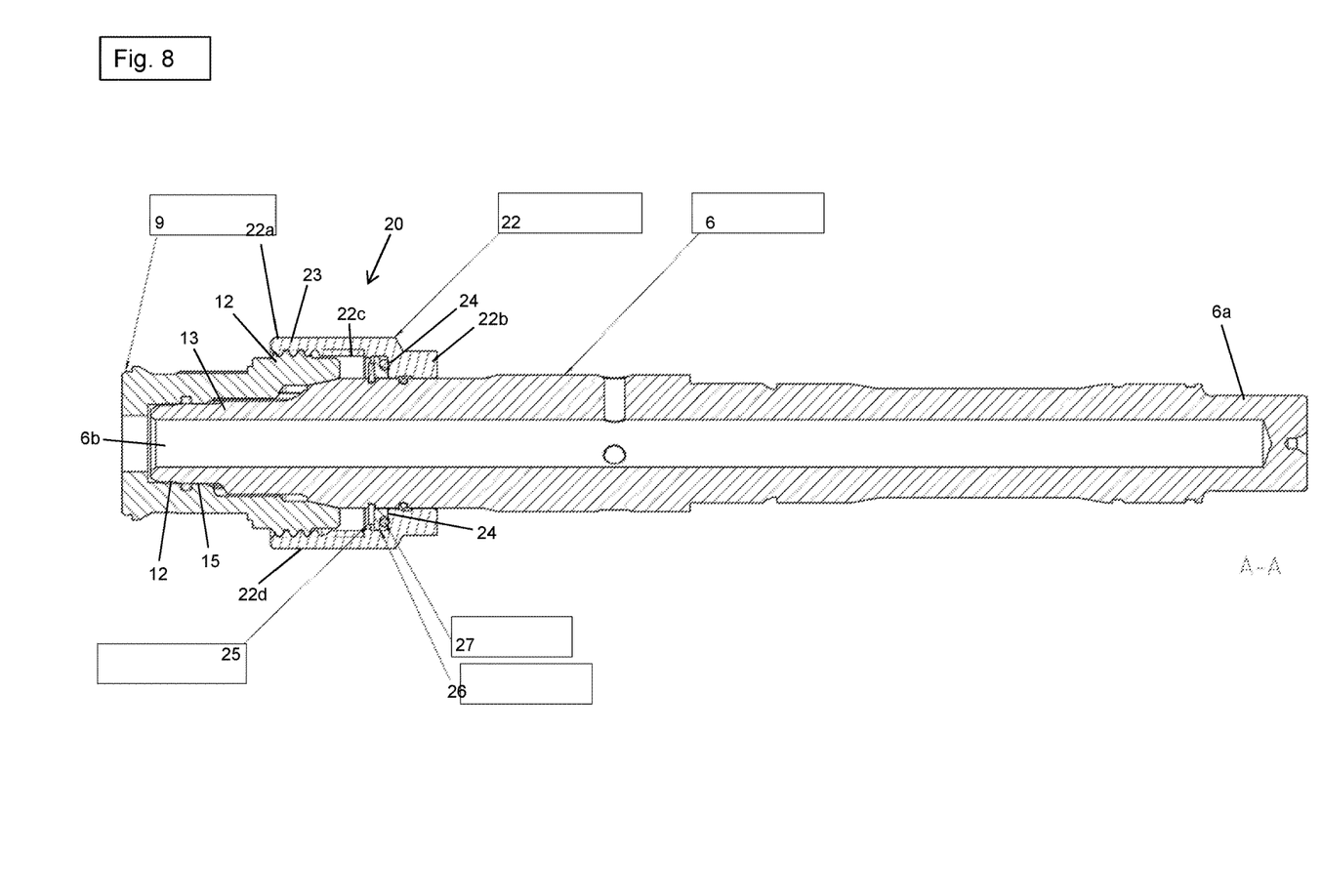
FIG. 8 shows a cross-sectional view of the device according to the present invention for holding and securing the tool on the machine tool along the section line A-A in FIG. 6.
Figure 9:
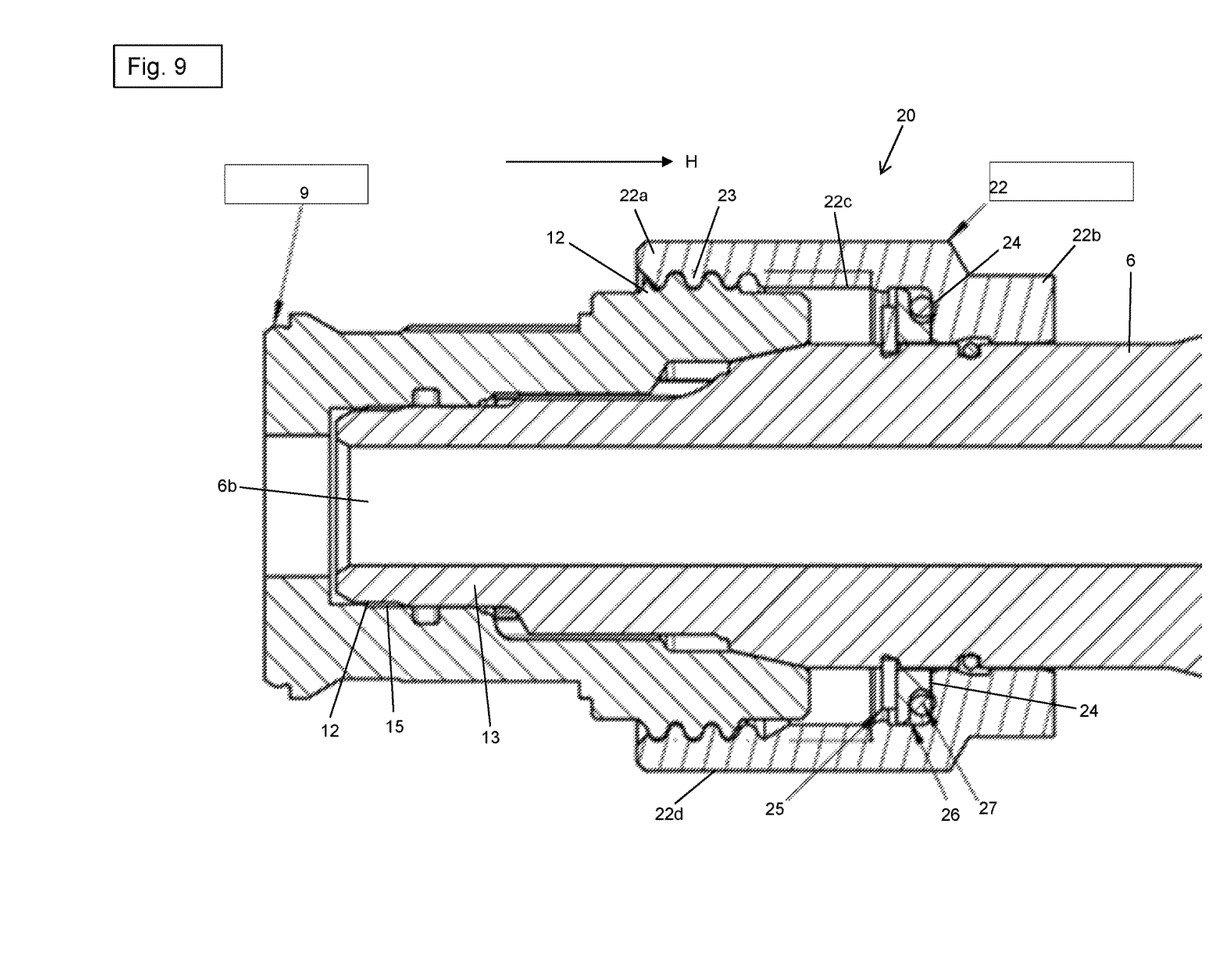
FIG. 9 shows another cross-sectional view of the device according to the invention for holding and securing the tool on the machine tool along the section line A-A in FIG. 6.

As depicted in FIGS. 8 and 9, attenuator 27 is placed behind washer disk 26 in arrow direction H. Attenuator 27 in this case is in the form of an O-ring manufactured from an elastic material such as, for example, various types of rubber, perfluorinated rubber (FFKM or FFPM), polyethylene (PE) or polytetrafluoroethylene (PTFE).

If drill bit 2 is to be connected to output shaft 6 in order to transmit the torque generated in electric motor 4 from output shaft 6 to drill bit 2, connecting end 13 of output shaft 6 is inserted into attachment end 9 of drill bit 2 (see FIGS. 8 and 9). As a result of the interconnection, external toothing 15 of output shaft 6 engages in internal toothing 11 of drill bit 2, thereby forming a non-rotatable connection. The internal thread of union nut 22 is screwed over external thread 12 of attachment end 9 of drill bit 2 in order to prevent drill bit 2 and output shaft 6 from being axially separated again (see FIGS. 8 and 9). When union nut 22 is screwed to attachment end 9 of drill bit 2, inner surface 24 of union nut 22 is pressed against attenuator 27.

Thus, when tightening union nut 22 to attachment end 9 of drill bit 2, the force flows in the axial direction (opposite arrow direction H) via a hard stop between locking ring 25 of union nut 22 and washer disk 26 of output shaft 6 at a preferably small diameter with sufficient wear resistance. Attenuator 27 ensures a defined pre-tensioning in this tensioning system (i.e., in the system made up of union nut 22 and attachment end 9) and, in the process, safeguards against an undesirable loosening of the screw-fitting of union nut 22 from attachment end 9 of drill bit 2.

What is claimed is:

1. A device for holding and securing a tool, the device comprising:
   an output shaft for transmitting a torque generated in a machine tool to the tool; and
   a union nut positioned around the output shaft for detachably connecting the output shaft to an attachment end of the tool;
   the output shaft including a locking ring and the union nut including a washer disk and an attenuator, the washer disk being positioned between the locking ring and the attenuator.

2. The device as recited in claim 1, wherein in a connected state of the union nut with the attachment end of the tool, an inner surface of the union nut presses against the attenuator, the washer disk pressing in a force-fitting manner against the locking ring as result.

3. The device as recited in claim 1, wherein the union nut includes an internal thread and the attachment end of the tool includes an external thread corresponding to the internal thread of the union nut, and wherein the union nut is configured to detachably connect the output shaft to the attachment end of the tool.

4. The device as recited in claim 1, wherein the union nut is made of plastic.

5. The device as recited in claim 1, wherein the locking ring and the washer disk are made of metal.

6. The device as recited in claim 1, wherein the tool is a drill bit.

7. The device as recited in claim 1, wherein the machine tool is a core drill.

8. The device as recited in claim 7, wherein the core drill comprises an electric motor configured to generate the torque.

9. The device as recited in claim 2, wherein in a connected state of the union nut with the attachment end of the tool, external toothing of the output shaft engages with internal toothing of the attachment end of the tool to form a non-rotatable connection.

10. The device as recited in claim 9, wherein in a connected state of the union nut with the attachment end of the tool, the torque generated in the machine tool is transmitted to the tool via the union nut.

11. The device as recited in claim 1, wherein the attenuator is an O-ring formed of an elastic material.

12. A method for operating a machine tool, comprising:
    positioning a union nut around an output shaft of the machine tool for detachably connecting the output shaft to an attachment end of the tool;
    engaging the union nut to the attachment end of the tool until a hard stop is reached between a locking ring of the output shaft and a washer disk of the union nut, wherein the washer disk is positioned between the locking ring and an attenuator of the union nut; and
    generating a torque in the machine tool, and transmitting the torque from the output shaft of the machine tool to the tool via the engagement of the union nut to the attachment end of the tool.

13. The method as recited in claim 12, further comprising engaging an internal thread of the union nut with an external thread of the attachment end of the tool to detachably connect the output shaft to the attachment end of the tool.

14. The method as recited in claim 12, further comprising engaging external toothing of the output shaft with internal toothing of the attachment end of a tool to form a non-rotatable connection.

* * * * *